Dec. 11, 1962 D. AGUSTA 3,067,528
HELICOPTER TRAINING APPARATUS
Filed Feb. 17, 1960
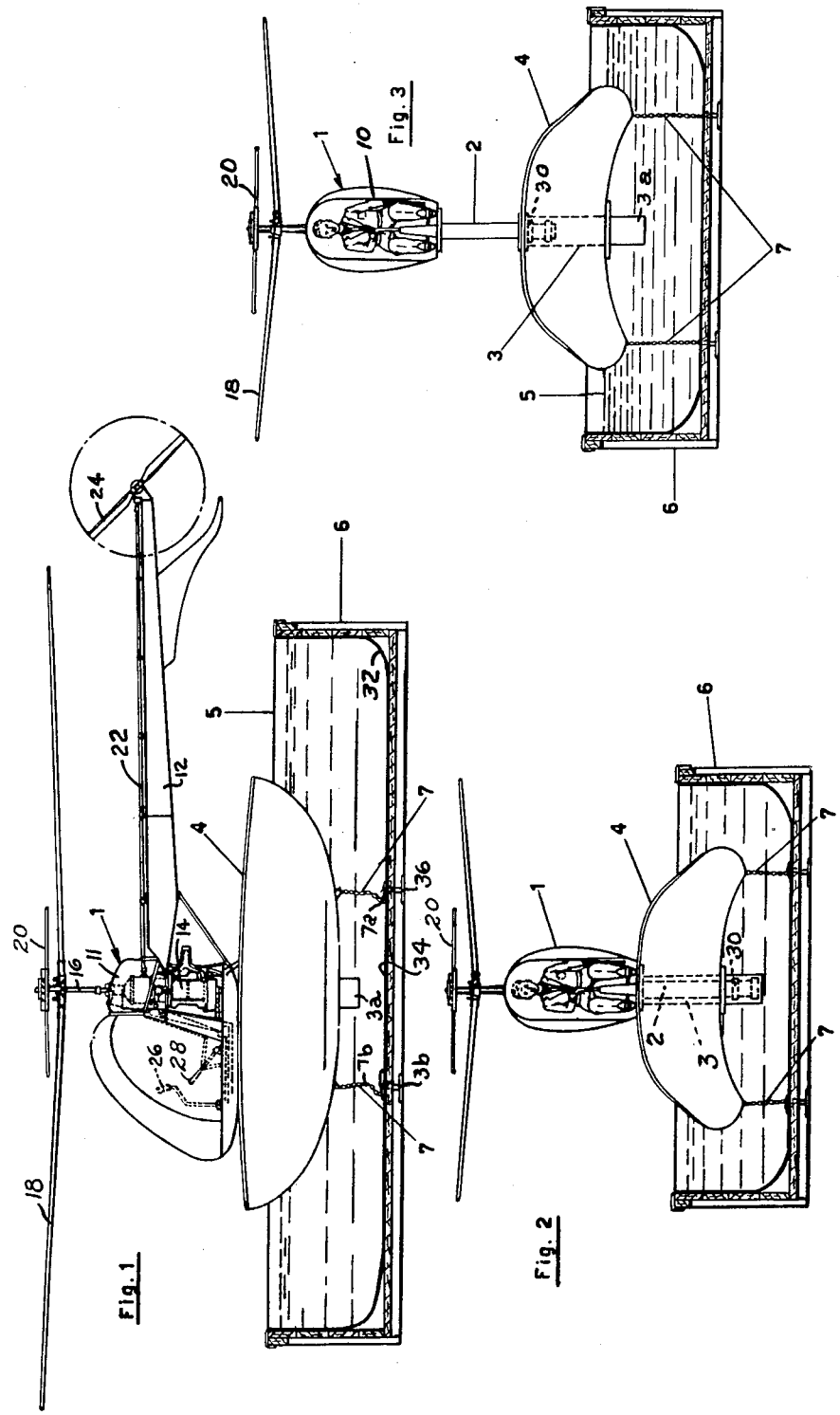

United States Patent Office 3,067,528
Patented Dec. 11, 1962

3,067,528
HELICOPTER TRAINING APPARATUS
Domenico Agusta, Milan, Italy, assignor to M. V.
Meccanica Verghera, S.p.A., Milan, Italy
Filed Feb. 17, 1960, Ser. No. 9,337
Claims priority, application Italy May 8, 1959
5 Claims. (Cl. 35—12)

The present invention relates, in general, to aircraft and in particular to a helicopter training apparatus.

In teaching pilots how to fly a helicopter, the flying school utilizes helicopters designed for stationary or hovering flight as well as for horizontal flight. The initial phase of instruction for a student pilot is devoted to hovering or stationary flight at an altitude of a very few miles. However, due to improper operation or manipulation of the aircraft or controls, the student pilot may rise too far above the ground and he will then find himself in difficulty. For the same reasons, the student pilot is exposed to possible injury to himself or damage to the aircraft in the case of a sudden descent.

In view of the foregoing, it is an object of the present invention to provide means which result in the obviation of the disadvantages of prior art pilot training procedures for helicopters.

It is another object of the present invention to provide a helicopter training apparatus having means which assure that the student pilot will not be in danger in the event of improper manipulation of the helicopter or its controls.

It is a further object of the present invention to provide a helicopter training apparatus having means to attain the possibility that the apparatus will not be damaged inadvertently by the student pilot.

It is a still further object of the present invention to provide a helicopter training apparatus which is of relatively simple construction and yet is highly effective in the training of pilots.

The above and other objects of the invention will become further apparent from the following detailed description, reference being made to the accompanying drawings, showing a preferred embodiment of the invention.

In the drawings which illustrate the best mode presently contemplated for carrying out the invention:

FIG. 1 is a side view of a helicopter pilot training apparatus pursuant to the present invention;

FIG. 2 is a front view of the apparatus with the latter in an inoperative position; and FIG. 3 is a view similar to FIG. 2 with the apparatus in a hovering condition.

Referring now to the drawings in detail, there is shown a conventional fully operative helicopter 1, which as here shown, comprises a fuselage 11 having a pilot's cabin 10 at the front thereof, and an elongated tail 12 at the rear thereof. The fuselage mounts a conventional helicopter motor 14 which drives the main shaft 16 for operating the main horizontal rotor 18 and an auxiliary horizontal rotor 20. The motor 14 also drives a shaft 22 which extends along the fuselage tail 12 and operates a tail rotor 24. There is provided in the cabin 10, a conventional collective pitch control 26 and a conventional cyclic control 28. The collective pitch control makes the helicopter ascend or descend and the cyclic control changes the plane of rotation of the main rotor, thus controlling forward, rearward and sideward motion.

The small auxiliary rotor 24 serves to provide anti-torque forces. Unfavorable engine torque may be eliminated by rotating the horizontal rotors 18 and 20 in opposite directions.

Pursuant to the present invention provision is made for a telescopic rod 2 which depends from the forepart of the pilot's cabin 10. The rod 2 slides within a guide member 3 which is fixed within a float 4. The withdrawal of the rod 2 from the guide 3 is prevented by an enlarged collar 30, it being understood that the diameter of the upper opening into guide 3, through which the rod 2 slides, is less than the diameter of the detent or collar 30.

The float 4 is formed of any suitable material and, in side view, has the shape of a boat hull, as best seen in FIG. 1 and in front view, has a downwardly arcuate configuration. Provision is made for a tank 6, provided with a water-tight liner 32, which is filled with water 5. It will be understood that in lieu of the tank 6 provided with water 5, the water in a small lake or river may be utilized for the same purpose.

The float floats easily on the water 5, and as here shown, is secured to the bottom 34 of the tank by means of chains 7, the tank bottom resting on supports 36 which are mounted on the ground. It will be noted that the guide 3 projects from the bottom of the float.

As best shown in FIGS. 1 and 2, in the inoperative condition of the helicopter 1, the float rests in the water in a normal floating condition, depending on the weight of the helicopter, the lower end 3a of guide 3 being close to the bottom of the tank and the chains 7 being partially coiled, as at 7a, and slack, as at 7b. FIG. 2 illustrates the pilot in position in the cabin 10 prior to vertical take-off, the aircraft being in the same position, relative to the tank, as in FIG. 1.

In order to make the aircraft ascend in a vertical direction, from its inoperative condition shown in FIGS. 1 and 2, the pilot operates the collective pitch control 26, often starting up the plane's motor 14, to cause the plane to rise in a vertical direction. However, the extent of vertical rise is limited firstly by the telescopic rod 2 and secondly by the chains 7.

As the plane ascends in a vertical direction, the rod 2 is withdrawn from the guide 3. At its maximum withdrawal from the guide 3, the collar or detent 30 on the rod engages a complementary part on the upper end of the guide to prevent further withdrawal of the rod. However, continued ascent of the plane will cause the float 4 to move upwardly from the tank 6, such movement being taken up by the slack 7b in the chains 7 and by the unwinding of the coiled portions 7a thereof until the chain is stretched taut, as in FIG. 3.

This limits the upward movement of the plane, so that the plane can hover in the positon shown in FIG. 3, or it can return to the position thereof shown in FIGS. 1 and 2. It will be apparent that if the pilot improperly manipulates the controls during ascent of the plane it cannot rise beyond the position shown in FIG. 3. In the event that the pilot improperly manipulates the controls to effect descent of the plane so as to cause a too rapid descent, neither the pilot nor the plane can be injured since any shock resulting from too precipitous a descent is taken up by the water, the float acting to cushion the shock.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. Helicopter training apparatus comprising a helicopter plane, a fixed base, means to limit the vertical ascent of said plane, and means connected to said plane and said fixed base to cushion shock due to precipitous descent of the plane, said ascent limiting means comprising vertically expansible means operatively connected to said plane and said fixed base, said expansible means including a fixed guide connected to said fixed base and a telescopic member mounted on said plane and operable in said fixed guide, means on said fixed guide limiting withdrawal of said member from said guide.

2. Helicopter training apparatus comprising a helicopter plane, means to limit the vertical ascent of the plane, and means to cushion shock due to precipitous descent of the plane, said ascent limiting means comprising vertically expansible means operatively connected to a fixed base, said expansible means being a telescopic member mounted on said plane and operable in a fixed guide, means limiting withdrawal of said member from said guide, and the latter being operatively connected to said fixed base, said operative connection including chain means which are normally slack in the inoperative condition of said plane.

3. Helicopter training apparatus comprising a helicopter plane, means to limit the vertical ascent of the plane, and means to cushion shock due to precipitous descent of the plane, said ascent limiting means comprising vertically expansible means operatively connected to a fixed base, and said shock-cushioning means being a float on which said plane is mounted, said expansible means being a fixed guide mounted in said float, a telescopic member mounted on said plane and operable in said guide, means limiting withdrawal of said member from said guide, and normally slack chain means connected between said float and a fixed base.

4. Helicopter training apparatus comprising a helicopter plane, means to limit the vertical ascent of the plane, and means to cushion shock due to precipitous descent of the plane, said ascent limiting means comprising vertically expansible means operatively connected to a fixed base, and said shock-cushioning means being a float on which said plane is mounted, said expansible means being a fixed guide mounted in said float, a telescopic member mounted on said plane and operable in said guide, means limiting withdrawal of said member from said guide, and normally slack chain means connected between said float and a fixed base, and water tank means in which said float is disposed, said fixed base being the bottom of said tank.

5. Helicopter training apparatus comprising a helicopter plane, means to limit the vertical ascent of the plane, and means to cushion shock due to precipitous descent of the plane, said ascent limiting means comprising vertically expansible means operatively connected to a fixed base, and said shock-cushioning means being a float on which said plane is mounted, said expansible means being a fixed guide mounted in said float, a telescopic member mounted on said plane and operable in said guide, means limiting withdrawal of said member from said guide, and normally slack chain means connected between said float and a fixed base, said plane having a pilot's cabin and said telescopic member being secured to said cabin and depending therefrom.

References Cited in the file of this patent
UNITED STATES PATENTS

| | | |
|---|---|---|
| 2,702,171 | Katzenberger | Feb. 15, 1955 |
| 2,916,832 | Hofmann | Dec. 15, 1959 |